(12) United States Patent
del Prado Pavon et al.

(10) Patent No.: US 7,756,090 B2
(45) Date of Patent: Jul. 13, 2010

(54) SYSTEM AND METHOD FOR PERFORMING FAST CHANNEL SWITCHING IN A WIRELESS MEDIUM

(75) Inventors: Javier del Prado Pavon, Ossining, NY (US); Amjad Soomro, Hopewell Junction, NY (US); Sunghyun Choi, Seoul (KR)

(73) Assignee: Koninklijke Philips Electronics N.V., Eindhoven (NL)

( * ) Notice: Subject to any disclaimer, the term of this patent is extended or adjusted under 35 U.S.C. 154(b) by 1577 days.

(21) Appl. No.: 10/261,889

(22) Filed: Sep. 30, 2002

(65) Prior Publication Data
US 2003/0219001 A1 Nov. 27, 2003

Related U.S. Application Data

(60) Provisional application No. 60/363,612, filed on Mar. 12, 2002.

(51) Int. Cl.
H04W 4/00 (2009.01)
(52) U.S. Cl. .................. 370/338; 370/349; 370/445
(58) Field of Classification Search .............. None
See application file for complete search history.

(56) References Cited

U.S. PATENT DOCUMENTS

| | | | | |
|---|---|---|---|---|
| 6,697,013 B2 * | 2/2004 | McFarland et al. | .......... | 342/159 |
| 6,990,116 B1 * | 1/2006 | Young et al. | ............... | 370/445 |
| 7,046,690 B2 * | 5/2006 | Sherman | ................. | 370/445 |
| 7,058,074 B2 * | 6/2006 | Ho et al. | .................. | 370/447 |
| 2003/0156553 A1 * | 8/2003 | Benveniste | ............. | 370/317 |

* cited by examiner

Primary Examiner—Michael J Moore, Jr.
(74) Attorney, Agent, or Firm—Larry Liberchuk

(57) ABSTRACT

The present invention relates to a method for performing fast channel switching in a wireless local area network (WLAN). The method generally includes the steps of: determining that the wireless medium has been idle during a PCF interframe space (PIFS) period, transmitting a first management frame during a slot time following the PIFS period; wherein the transmission at said slot time substantially guarantees priority access said wireless medium; and performing fast channel switching in the network in accordance with directives contained within the management frame. Fast channel switching as defined herein includes one of quieting the current channel and/or switching from a current channel of operation to a new channel of operation. The method overcomes the latencies associated with contention based services, such as the DCF service. The method may further include the additional step of transmitting one or more additional management frames, whose format is identical to said first management frame, each additional frame preferably separated by the PIFS interframe space to provide a higher degree of transmission reliability. The method is preferably performed at an access point (AP) in an infrastructure network or in an STA in an ad-hoc network.

18 Claims, 4 Drawing Sheets

US 7,756,090 B2

SYSTEM AND METHOD FOR PERFORMING FAST CHANNEL SWITCHING IN A WIRELESS MEDIUM

CROSS REFERENCE TO RELATED APPLICATIONS

This application claims the benefits of provisional application Ser. No. 60/363,612, filed on Mar. 12, 2002, the teachings of which are incorporated herein by reference.

BACKGROUND OF THE INVENTION

1. Technical Field of the Invention

The present invention relates generally to wireless local area networks (WLANs). More particularly, the present invention relates to a method and system for providing priority access to a WLAN to perform fast channel switching.

2. Discussion of the Related Art

In a typical 802.11 based wireless local area network (WLAN), access to the wireless medium is controlled at the MAC layer by coordination functions. The 802.11 standard provides for two coordination functions, the distributed coordination function (DCF), and the point coordination function (PCF). If contention-free service is required, it can be provided by the point coordination function (PCF), which is built on top of the DCF. The PCF is an optional part of the 802.11 specification and has not been widely implemented to date. Frame exchanges between network stations STAs under the DCF dominate currently deployed WLANs. The DCF is based on a listen-before-talk scheme referred to as CSMA/CA (carrier sense multiple access with collision avoidance) as described by the IEEE 802.11 standard, incorporated herein by reference in its entirety.

In accordance with the DCF scheme, before attempting to transmit a frame, each station checks whether the medium is idle. If the medium is not idle, the stations defer to each other and employ an exponential back-off algorithm to avoid transmission collisions.

One drawback with the DCF scheme is that network stations may incur relatively long delays in attempting to exchange frames over the wireless medium in the case of high traffic load in the network.

A consequence of these potential transmission delays is that compliance with the dynamic frequency selection (DFS) regulatory requirement for operation in the 5 GHz band in Europe may not be met. The DFS regulatory requirement stipulates, inter alia, that a wireless STA must (1) quickly halt transmissions in a current channel within a prescribed time and (2) switch channels within a prescribed time when a primary user is detected. A primary user may be, for example, a radar tracking system or a satellite system.

Thus, there is a need for an improved medium access scheme, performed at the MAC layer, to provide fast channel access to a wireless medium to quickly perform a channel switch and/or quickly stop transmissions in the current channel to prevent potential interference with mission critical functions being performed by primary users in the co-located systems.

SUMMARY OF THE INVENTION

The present invention is directed to a method and system for providing fast channel priority access, to send time critical frames, such as Spectrum Management Action Frames, in the MAC layer protocol of a communications system such as, for example, with respect to an 802.11 based wireless communication system.

A key point of novelty of the invention is that priority access to the wireless medium is obtained to enable the prioritized transmission of one or more spectrum management frames from a source node (e.g., an AP or STA) to perform fast channel switching. Fast channel switching, as defined herein includes the announcement of a channel switch or the halting of all transmissions in a current channel of operation.

The present invention, encompasses, in one of its aspects, a method for providing fast channel access to a wireless medium. The method generally includes the steps of: determining that the wireless medium has been idle during a PCF interframe space (PIFS) period, transmitting a first management frame during a slot time following said one PIFS period; wherein the transmission at said slot time substantially guarantees priority access to said wireless medium; and performing fast channel switching in the network in accordance with directives contained within the management frame. The method may further include the additional step of transmitting one or more additional management frames, whose format is identical to said first management frame, each additional frame separated by the PIFS interframe space to provide a higher degree of transmission reliability. The method is preferably performed at an access point (AP) in an infrastructure network or in an STA in an ad-hoc network.

The present invention encompasses, in another of its aspects, a system for providing fast channel priority access to enable the prioritized transmission of Spectrum Management Action Frames, in a MAC protocol of a communications system such as, for example, with respect to an 802.11 based wireless communication system. The system includes a means for determining that the wireless local area network (WLAN) is idle for one PCF interframe space (PIFS) period; and a means for transmitting a first management frame at the slot boundary of the PIFS period, wherein the transmission of said first management frame at said PIFS slot boundary accords said node priority access to said WLAN; a means for performing fast channel switching in the network in accordance with directives contained in a first management frame; and a means for transmitting one or more additional management frames subsequent to the transmission of said first management frame for providing a higher degree of transmission reliability, wherein each additional management frame is separated by the PIFS time period.

The foregoing and other objects, features, aspects and advantages of the present invention will become more apparent from a careful reading of a detailed description provided herein below, with appropriate reference to the accompanying drawings.

BRIEF DESCRIPTION OF THE DRAWINGS

The invention, may be understood by reference to the following description, taken in conjunction with the accompanying drawings, in which.

DETAILED DESCRIPTION OF THE PREFERRED EMBODIMENT

The present invention is described below in the context of gaining priority access to an 802.11 based wireless medium controlled at the MAC layer which provides core framing operations. However, it is to be appreciated that the teachings of the invention discussed herein are not so limited. That is, the invention is applicable to other communications systems where network stations (e.g., mobile or fixed) make attempts to secure access to a medium associated with a base station or other communications system access point to perform fast channel switching as defined herein.

In a preferred embodiment, the present invention provides a system and associated method that allows a source node, which may be an access point (AP) in an infrastructure network or a station (STA) in an ad-hoc network to gain priority access to an 802.11 based wireless medium to transmit one or more prioritized spectrum management frames to perform fast channel switching (i.e., quickly announce a channel switch and/or halt all transmissions in the current channel). Priority access to the wireless medium enables the transmission of management frames at a point in time prior to the start of contention with other nodes so as to avoid well-known network latencies associated with the distributed access contention protocol such as access deferral and exponential back-off.

Figure 1:
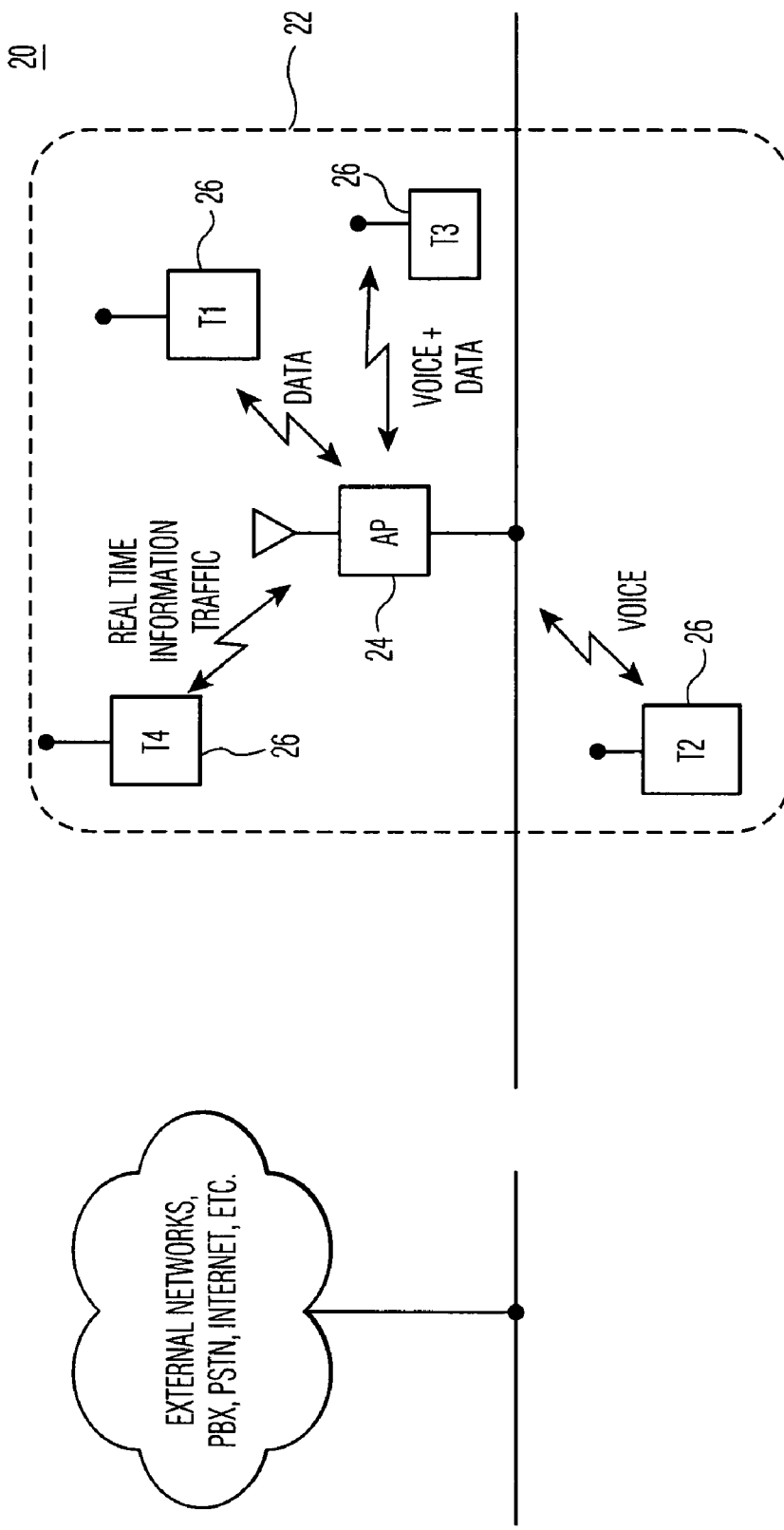
FIG. 1 is a diagram of an illustrative communications network that includes an illustrative wireless local area network in accordance with the present invention.

FIG. 1 illustrates a wireless LAN (WLAN) 20 system for implementing the method of the invention. Wireless LAN 20 defines an infrastructure network which includes a plurality of cells 22. Cell 22 includes an access point (AP) 24 (which is sometimes referred to as a wireless local bridge or a base station).

With continued reference to FIG. 1, cell 22 may include remote network stations (STAs) 26. Access point 24 and remote STAs 26 may be the transmitters and receivers of the system. Each STA 26 may be a mobile, portable, or stationary terminal. Each STA 26 may be a desktop workstation, laptop computer, palm top computer, handheld personal computer, pen-based computer, personal digital assistant, handheld scanner, data collector, handheld printer, etc.

If present, AP 24 may be an interface for communicating between wireless network 20 and a wireline network. AP 24 may be configured to provide a communications gateway between STAs 26 and AP 24 that are in cell 22 and also between a wireline network and the STAs 26. AP 24 is typically configured to convert signals between wireline and wireless communications mediums. The conversion may allow the access point to pass communication information between the wireline network and wireless STAs 26. The wireline network may be coupled to an external network (e.g., PBX, PSTN, Internet, etc.).

Figure 2:
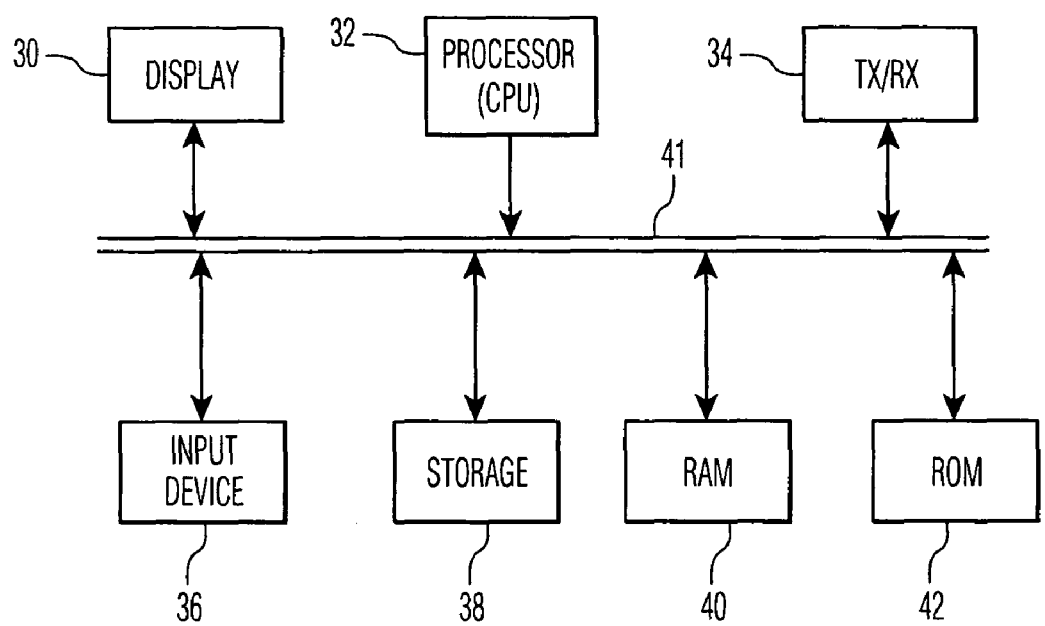
FIG. 2 illustrates a simplified block diagram of an access point (AP) and each station (STA) within a cell according to the embodiment of the present invention.

Referring now to FIG. 2, both the AP 24 and STAs 26 may include a display 30, a CPU 32, a transmitter/receiver 34, an input device 36, a storage module 38, a random access memory (RAM) 40, a read-only memory (42), and a common bus 41. Although the description may refer to terms commonly used in describing particular computer systems, the description and concepts equally apply to other processing systems, including systems having architectures dissimilar to that shown in FIG. 2. The transmitter/receiver 34 is coupled to an antenna (not shown) to transmit desired data and its receiver converts received signals into corresponding digital data. The CPU 32 operates under the control of an operating system contained in the ROM 42 and utilizes RAM 40 to perform the frequency selection within a wireless local area network (WLAN), by enabling the AP in an infrastructure network or an STA in an ad-hoc network, to provide a new channel or wireless link for the rest of stations (STAs).

In operation, in a typical 802.11 based wireless local area network (WLAN), such as wireless LAN 20 of FIG. 1, a plurality of STAs 26 may be associated with AP 24 if present. Each STA 26 may have different communications capabilities and requirements. AP 24 may manage the communications traffic between STAs 26 and the wireline network. AP 24 may manage the communications traffic by controlling when frames are transmitted to each remote STA 26 in cell 22. The communications traffic in cell 22 may include data frames (e.g., signals that carry frames to provide data communications), voice frames (e.g., signals that carry frames to provide voice communications), real-time frames (e.g., signals that carry frames to provide real-time communications such as multimedia or voice communications), management frames (e.g., signals that carry frames to provide network management communications), etc.

To perform fast channel switching, the method of the present invention requires priority access to the wireless medium. Obtaining priority access to the wireless medium has been previously described in IEEE 802.11e D3.2, incorporated herein by reference in its entirety.

In general, the 802.11 standard provides two coordination functions for gaining access to the wireless medium to exchange communication traffic. The functions are controlled at the MAC layer. The two functions are the distributed coordination function (DCF) and the point coordination function (PCF). As discussed above, the PCF is an optional feature of the 802.11 standard and has not been widely deployed to date. The DCF is a mandatory feature of the 802.11 standard and provides a standard Ethernet-like contention based service that is based on a listen-before-talk scheme called CSMA/CA (carrier sense multiple access with collision avoidance) as described in the IEEE 802.11 standard. Both the PCF and DCF utilize interframe spacings for coordinating access to the medium. In particular, the 802.11 standard defines four different interframe spacings. Three are used to determine medium access.

Figure 3:
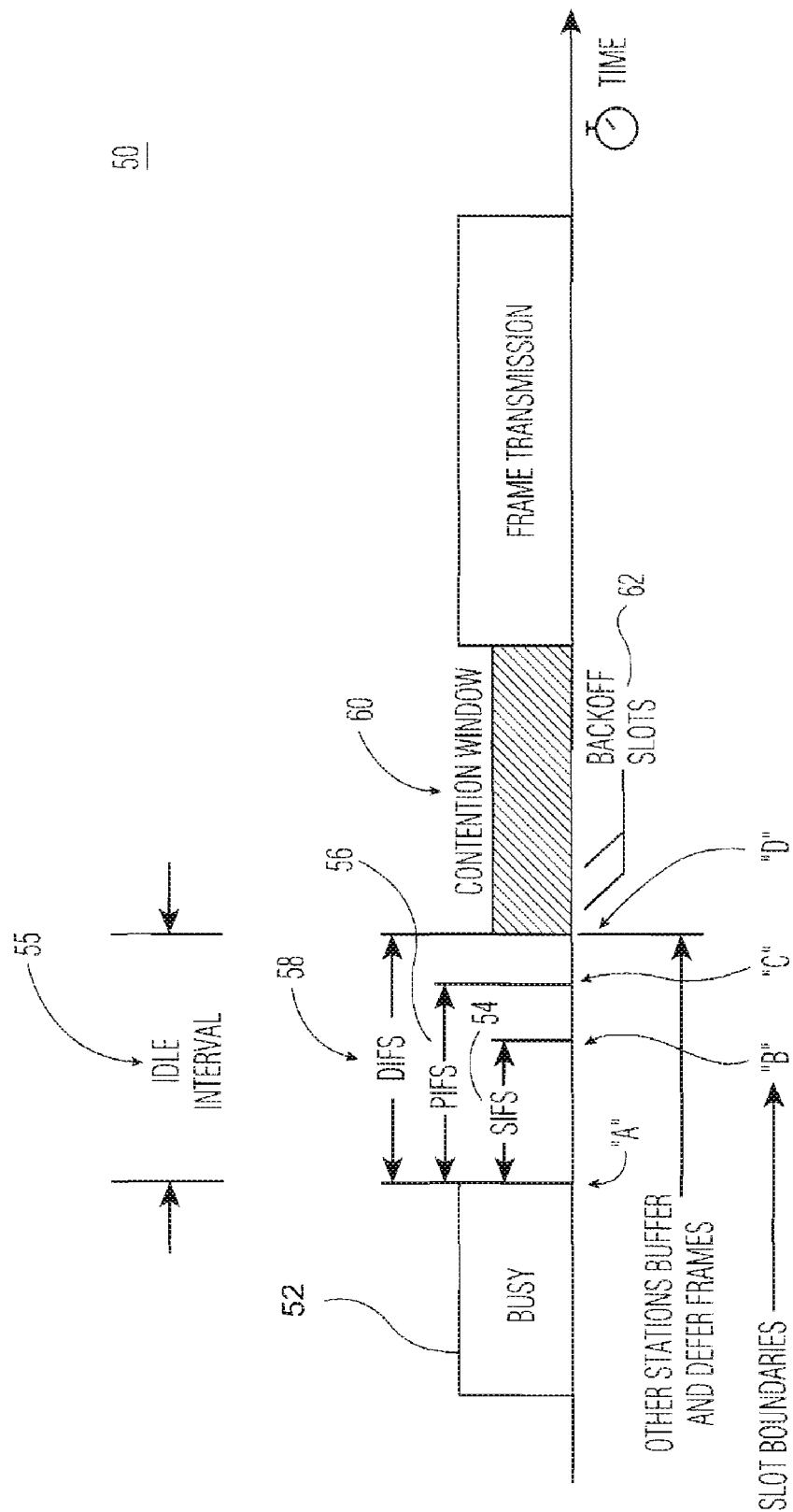
FIG. 3 is a time-line 30 illustrating the relationship between the three interframe spacings for determining priority access to a wireless medium.

With reference to FIG. 3, there is shown a time-line 50 illustrating the relationship between the three interframe spacings (i.e., SIFS, PIFS, DIFS) used to determine medium access. As is well known in the art, the three interframe spacings create different priority levels for different types of frames over the medium. The different priority levels establish that high-priority frames don't have to wait as long as low-priority frames after the medium has become idle. Therefore, if there is any pending high-priority frames, such an acknowledgement frame, it gains access to the network before low-priority frames have an opportunity to do so.

With reference to FIG. 3, the wireless medium is initially shown as busy 52. During this busy interval 52, it is assumed that one of the network stations 24 or 26 has gained control of the wireless medium and is transmitting a frame. During the busy interval 52, all of the other stations 24, 26 that do not presently have control of the wireless medium must remain silent and defer any intended signal communication. At the end of the busy interval (see point "A"), the medium becomes idle.

The interval following the busy interval 52 is defined as an idle interval 55 inside of which three interframe spacings are shown. Each of the three interframe spacings provides a unique priority level for STA 24 or 26 access to the idle medium. They are, the short interframe space (SIFS) interval 54, which is used for the highest-priority transmissions. Once the SWFS interframe spacing interval 54 has elapsed at the SIFS slot boundary (see point "B"), high-priority transmissions can begin. Once these high-priority transmissions begin, the medium becomes busy again, so frames transmitted after the SIFS interframe spacing interval 54 has elapsed have priority over lower-priority frames that can be transmitted only after longer intervals such as the PIFS 56 and DIFS 58 interframe spacing intervals.

Also shown at FIG. 3 is the PCF interframe spacing interval (PIFS) 56 which is used by STAs 24 and the AP 26 operating under the PCF service. Similar to that described above with reference to the SIFS interframe spacing interval 54, STAs 24 and AP 26 are permitted immediate access to the medium if the medium is determined to be idle at the PIFS slot boundary (see point "C"). The PIFS interframe spacing interval 56 is presently only used in the PCF service mode for providing contention free service. As stated above, the PCF service is seldom incorporated into 802.11 based LAN deployments, and as such will not be discussed further.

With continued reference to FIG. 3, the DIFS interframe spacing interval 58 is used by STAs 24 and AP 26 operating in the contention-based DCF service mode. In accordance with the DCF service, STAs 24 and AP 26 are permitted immediate access to the medium if the medium is determined to be idle at the DIFS slot boundary (see point A fourth interframe spacing interval, referred to as the extended interframe space (EIFS), is not shown in FIG. 3 because it is not a fixed interval, but is only used when there is an error in frame transmission, and will not be discussed further.

As is well known, the DCF contention-based service operates by first sensing the wireless medium to determine whether it has been idle for the DIFS interframe spacing interval 36 before transmitting. After the DIFS interframe spacing interval 58 has elapsed, an exponential back-off operation follows. To perform back-off, an STA 24 generates a random number between zero and a contention window 60. This random number is the number of slots 62 that the STA must wait before transmitting. During periods in which the channel is clear, the transmitting node decrements its backoff counter. When the backoff counter reaches zero, the node transmits the packet. As is apparent the DCF service is subject to latencies such as drawback and access deferral.

To perform fast channel switching in accordance with the principles of the invention, the afore-mentioned latencies associated with the conventional DCF service, described above, cannot be tolerated. The present invention overcomes these latency concerns by employing a technique for gaining priority access to the medium to perform operations associated with fast channel switching in a contention free manner, as will be described.

In accordance with one embodiment for obtaining fast channel access, an STA 24 or AP 26 senses the medium to determine if the medium is idle during the PIFS interframe spacing interval 56. If the medium remains idle at the PIPS slot boundary (see point "C" of FIG. 3), the AP 26 or STA 24 may transmit a management frame at the PIPS slot boundary (point "C") to thereby obtain prioritized access to the channel. The management frame includes directives for performing fast channel switching which may include (1) quickly halting transmissions in a current channel within a prescribed time and (2) quickly switching channels within a prescribed time when a primary user is detected.

It is noted that the priority access scheme of the present invention does not replace the conventional contention-based service, but rather serves as a supplementary feature for gaining priority access by the AP 26 or STA 24 in those situations where it is required to transmit a management frame quickly. It is further noted that, in contrast with the conventional contention-based service, which includes the "back-off" procedure, as described above, there is no backoff procedure associated with the channel priority access scheme of the present invention. By not including an associated back-off procedure in the method of the invention, contention with other STAs is avoided and priority access is thereby substantially assured.

Figure 4:
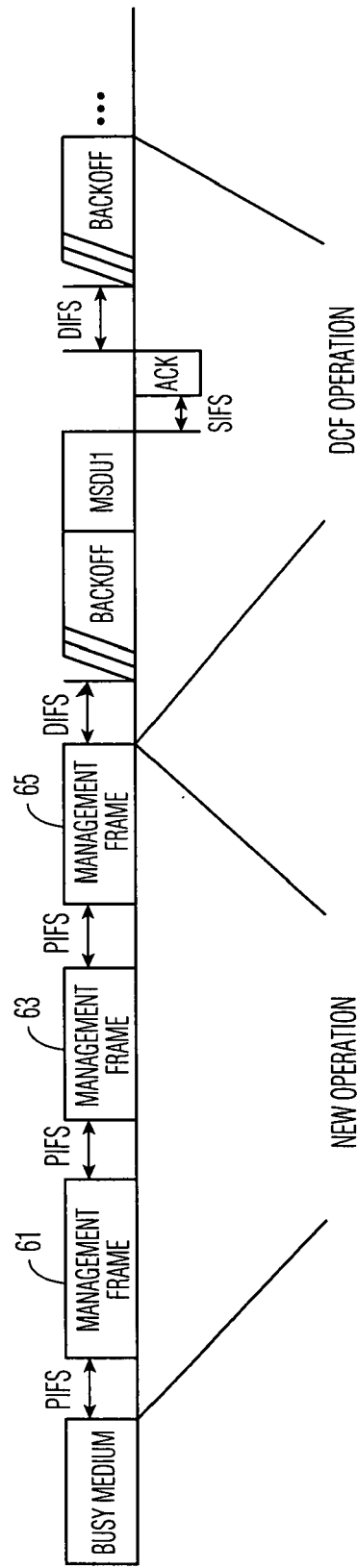
FIG. 4. illustrates the transmission of three management frames in accordance with the method of the invention.

With reference now to FIG. 4, there is shown three management frames being transmitted in accordance with the method of the invention. As described above, a single management frame 61 is transmitted at the PIFS slot boundary (point "C"). However, correct reception of the management frame may not be assured with a single transmission. Therefore, the present invention contemplates the transmission of additional management frames 63, 65 preferably separated by the PIFS time period to provide a higher degree of transmission reliability. Three are shown in FIG. 4, however, more or less management frames may be used.

Accordingly, modifications such as those suggested above, but not limited thereto, are to be considered within the scope of the invention.,

What is claimed is:

1. A method for obtaining fast channel access to a node in a wireless local area network (WLAN) operating in a distributed coordination function (DCF), said method comprising:
   determining, at said node, that the WLAN is idle for one PCF interframe space (PIFS) period; and
   transmitting a management frame during a slot interval following said one PIFS period without switching from the DCF,
   wherein the transmission of said management frame at said slot interval provides priority access to said WLAN and wherein said management frame includes directives for performing fast channel switching.

2. The method of claim 1, wherein said directives for performing fast channel switching include one of switching from a current channel of operation to a new channel of operation within a prescribed time and halting transmissions in said current channel of operation within a prescribed time.

3. The method of claim 1, wherein said node is an access point in an infrastructure WLAN and a wireless station in an ad-hoc WLAN.

4. The method of claim 1, wherein said transmitting further comprises transmitting over air from said node to a plurality of associated nodes in said WLAN.

5. The method of claim 1, wherein said management frame transmission occurs prior to the start of contention with a plurality of associated nodes thereby providing said priority access to said WLAN, wherein said contention is defined by said plurality of associated nodes associated with said WLAN competing for access to said WLAN.

6. The method of claim 5, wherein said contention with said plurality of associated nodes begins at a DIFS slot boundary, said DIFS slot boundary occurring later in time than said slot interval following said one PIFS period.

7. The method of claim 1, further comprising:
   transmitting at least one additional management frame subsequent to the transmission of said first management frame and prior to the start of said contention with said plurality of associated nodes.

8. The method of claim 6, wherein said first management frame and each of said at least one additional management frame is transmitted having a PIFS interval spacing (PIFS) there-between.

9. A node for use in a wireless local area network (WLAN) operating in a distributed coordination function (DCF), said node configured to:
- determine that the WLAN is idle for one PCF interframe space (PIFS) period; and
- transmit a first management frame during a slot interval following said one PIFS period without switching from the DCF,
- wherein said transmission of said management frame at said slot interval provides priority access to said WLAN and wherein said management frame includes directives for performing fast channel switching.

10. The node of claim 9, wherein said node is one of an access point in an infrastructure network and a wireless STA in an ad-hoc network.

11. The node of claim 9, wherein said node is further configured to transmit said management frame over air to a plurality of associated nodes in said WLAN.

12. The node of claim 9, wherein said node is further configured to transmit at least one additional management frame subsequent to the transmission of said first management frame and prior to the start of the contention with a plurality of associated nodes.

13. A system for granting priority access to a node in a wireless local area network (WLAN) operating in a distributed coordination function (DCF), the system comprising:
- a memory for storing a computer-readable code; and
- a processor operatively coupled to said memory, said processor being configured to:
  (1) determine, at said node, that the WLAN is idle for one PCF interframe space (PIFS) period; and
  (2) transmit a first management frame during the slot following said one PIFS period without switching from the DCF, said first management frame including directives for performing fast channel switching.

14. The system of claim 13, wherein said transmitting node is an access point in an infrastructure WLAN or a wireless station in an ad-hoc WLAN.

15. The system of claim 13, wherein said processor is configured to transmit over air to a plurality of associated nodes in said WLAN.

16. The node of claim 12, wherein said first management frame and each of said at least one additional management frames are transmitted having a PIFS interval spacing therebetween.

17. The system of claim 13, wherein said first management frame and said at least one additional management frame are transmitted having a PIFS interval spacing there between.

18. The system of claim 13, further comprising means for transmitting at least one additional management frame prior to the end of a DIFS interframe spacing interval after the first said management frame.

* * * * *